J. J. QUINN.
FLOOR SOCKET.
APPLICATION FILED MAY 27, 1919.

1,386,947.

Patented Aug. 9, 1921.

WITNESS:
Gustav Genzlinger

INVENTOR
Joseph J. Quinn
by Synnestvedt & Lechner
ATTORNEYS.

UNITED STATES PATENT OFFICE.

JOSEPH J. QUINN, OF PHILADELPHIA, PENNSYLVANIA, ASSIGNOR TO CONSOLIDATED EXPANDED METAL COMPANIES, OF BRADDOCK, PENNSYLVANIA, A CORPORATION OF PENNSYLVANIA.

FLOOR-SOCKET.

1,386,947.     Specification of Letters Patent.     Patented Aug. 9, 1921.

Application filed May 27, 1919. Serial No. 300,103.

*To all whom it may concern:*

Be it known that I, JOSEPH J. QUINN, a citizen of the United States, residing at 2310 E. Huntington street, Philadelphia, Pennsylvania, have invented certain new and useful Improvements in Floor-Sockets, of which the following is a specification.

This invention relates to floor sockets suitable for use in connection with guard devices and frames and the like. The primary object of my invention is the provision of an improved floor socket of simple and rigid construction, which is easy to manufacture and to which the frame or the device associated with the socket may be quickly adjusted.

Figure 1:
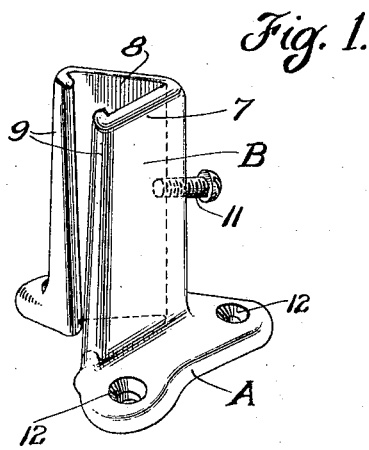
Figure 2:
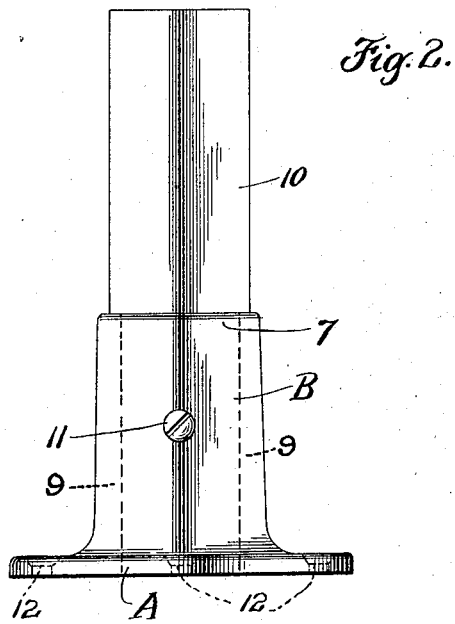

I accomplish the foregoing together with such other objects as may hereinafter appear, or are incident to my invention, by means of a construction which I have illustrated in preferred form in the accompanying drawings wherein:

Figure 1 is a perspective view of my improved socket; and Fig. 2 is a view illustrating the application of the socket and frame or other parts with which the socket is to be associated.

My invention is particularly useful in connection with frames having flat sides, such for example as a frame composed of angle irons and in the drawings I have shown my improvement applied in connection with an angle iron frame. The socket comprising a base portion A and a socket portion B rising there-above, the parts being preferably cast integral. The body of the socket is V-shaped and the sides 7 and 8 thereof are each provided with an inturned lip 9 at their outer extremities. The angle iron or other frame member 10 is inserted in the socket and is jammed against the lips 9 by means of a screw 11, or similar clamping element, which is preferably threaded into the socket at the point where the sides 7 and 8 merge. By this construction a single screw may be utilized to securely fasten the frame member in the socket. I prefer to locate the screw 11 at a point substantially half way between the ends of the socket for the reason that such location will insure rigidity. In this connection it is to be noted that I prefer to construct the lips 9 in such way as to provide an extended bearing surface for the edges of the angle iron. The base portion A of the socket is secured to the floor or other structure to which it is to be attached by means of bolts or screws or other members passing through the apertures 12.

In addition to the advantages already noted it is to be observed that the socket is very simple to manufacture. Less metal is also required, and it is further to be noted that there is less liability for the lodgment of dirt in the socket and if any should lodge, the same may be readily removed through the open side of the sockets.

I claim:

1. A floor socket comprising a supporting base, a substantially V-shaped socket portion, the sides of which have an inturned lip portion, and clamping means carried by the socket adapted to thrust the member inserted in the socket against said lip portions.

2. A floor socket comprising a supporting base, a V-shaped socket rising from the base and having substantially flat sides, an inwardly projecting portion on one of said sides, and a clamping element carried by the socket adapted to thrust the member inserted in the socket against said projecting portion.

In testimony whereof I have hereunto signed my name.

JOSEPH J. QUINN.